United States Patent [19]

Fish

[11] 4,424,796

[45] Jan. 10, 1984

[54] WIND-POWERED HEAT-GENERATING APPARATUS

[76] Inventor: James W. Fish, 11700 SW. 29th St., Yukon, Okla. 73099

[21] Appl. No.: 272,769

[22] Filed: Jun. 11, 1981

[51] Int. Cl.³ ............................................. F24C 9/00
[52] U.S. Cl. ..................................... 126/247; 122/26; 165/86
[58] Field of Search .......................... 126/247; 122/26; 165/86; 290/44; 416/119, 118, 117, 126

[56] References Cited

U.S. PATENT DOCUMENTS

| | | | |
|---|---|---|---|
| 44,018 | 8/1864 | Santee | 416/119 |
| 387,424 | 8/1888 | Koeppe . | |
| 1,083,472 | 1/1914 | Watson | 416/119 |
| 1,336,315 | 4/1920 | Plemmons | 416/119 |
| 1,578,835 | 3/1926 | Kothe . | |
| 1,645,855 | 10/1927 | De Vore | 416/126 X |
| 1,919,681 | 7/1933 | Anderson . | |
| 2,090,873 | 8/1937 | Lazarus | 122/26 |
| 2,251,344 | 8/1941 | Tesch | 122/26 |
| 2,625,929 | 1/1953 | Love et al. | 126/247 |
| 3,743,848 | 7/1973 | Strickland | 416/119 |
| 3,995,170 | 11/1976 | Graybill | 290/55 |
| 4,047,833 | 9/1977 | Decker | 415/2 |
| 4,115,027 | 9/1978 | Thomas | 126/247 X |

*Primary Examiner*—Samuel Scott
*Assistant Examiner*—Randall L. Green
*Attorney, Agent, or Firm*—Bill D. McCarthy

[57] ABSTRACT

A heat-generating apparatus comprising a friction chamber immersible in a fluid reservoir. A drive shaft is supported in the friction chamber and is rotationally driven by a power assembly. Shoe members engaged with an operating plate secured to the drive shaft are urged into friction-generating engagement with the friction chamber in response to drive shaft rotation. Heat thus generated is channeled to the fluid reservoir. The power assembly may comprise a windmill assembly, responsive to wind movement, which drives a rotary shaft engaged with the drive shaft.

6 Claims, 9 Drawing Figures

WIND-POWERED HEAT-GENERATING APPARATUS

FIELD OF THE INVENTION

The present invention relates generally to devices for generating heat from rotationally-produced frictional forces, and to wind power systems usable for powering the same.

BRIEF DESCRIPTION OF THE DRAWINGS

FIG. 9 is a detailed view of the governor assembly shown in FIG. 8.

DESCRIPTION OF THE INVENTION

Figure 1:
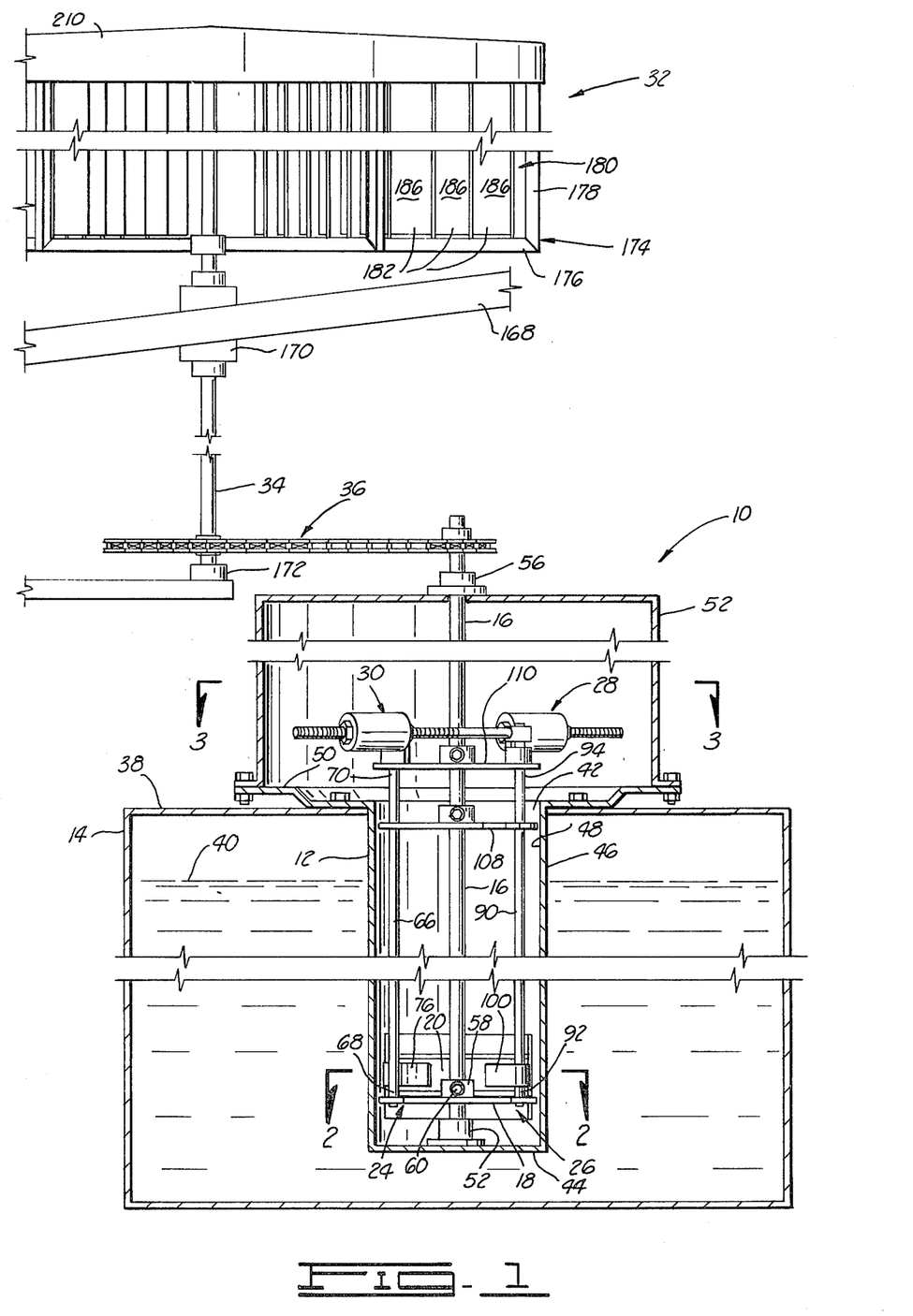
FIG. 1 is a cross-sectional elevational view of the heat-generating apparatus of the present invention, and the wind power system for the heat-generating apparatus.

With reference to FIG. 1, the heat-generating apparatus of the present invention, generally designed by reference numeral 10, comprises a friction chamber 12 disposed in a fluid reservoir 14. A drive shaft 16 is rotatably disposed within the friction chamber 12, and an operating plane 18 is supported on the drive shaft 16. Mechanically engaged with the operating plate 18 are a first shoe member 20 and a second shoe member 22. Supported on the operating plate 18 are a first shoe placement assembly 24 and a second shoe placement assembly 26.

Further comprising the heat-generating apparatus 10 are a first centrifugal control assembly 28 and a second centrifugal control assembly 30, which are, respectively, engaged with the first shoe placement assembly 24 and the second shoe placement assembly 26, in a manner to be described hereafter. In operation, rotation of the drive shaft 16 causes the centrifugal control assemblies 28 and 30 to actuate the shoe placement assemblies 24 and 26 so as to urge the shoe members 20 and 22 into a rotating frictional engagement with the friction chamber 22. The heat generated as the shoe members 20 and 22 rotate with the drive shaft 16 is employed to heat fluid in the fluid reservoir 14.

Rotation of the drive shaft 16 is driven by a power assembly, which may comprise a windmill assembly 32. The windmill assembly 32 features a rotary shaft 34 which is drivingly engaged with the drive shaft 16 by a power transmission assembly 36. The construction, arrangement and operation of these components and assemblies will now be described in greater detail.

With continued reference to FIG. 1, the fluid reservoir 14 preferably comprises a fluid-tight tank having an upper cover 38. The fluid reservoir 14 is insulated with a suitable insulating material (not shown) so as to minimize dissipation of heat associated with fluid contained within the fluid reservoir. The fluid reservoir 14 is fillable with a heat transfer fluid 40, which preferably comprises a liquid of high specific heat, such as water. The fluid reservoir may be fitted with necessary fluid connections (not shown), as required to permit transmission of heated heat transfer fluid 40 to an end use activity, and as required to permit replenishment of heat transfer fluid 40 in the fluid reservoir.

The friction chamber 12 is generally cylindrical in shape and comprises an open upper end 42 and a closed lower end 44. The cylindrical walls of the friction chamber 12 are characterized by an outer surface 46 and an inner surface 48, and are preferably formed from a sturdy material having good heat-transmitting characteristics, such as cast iron. The friction chamber 12 further comprises a projecting flange section 50 disposed at the open upper end 42.

The friction chamber 12 is received in an appropriately sized aperture in the upper cover 38 of the fluid reservoir 14, and is retained in a suspended position by the engagement of the flange section 50 with the upper cover 38. When so positioned, the outer surface 46 may be substantially immersed in the heat transfer fluid 40 filling the fluid reservoir 14. Conventional connectors, such as bolts, are provided to secure the flange section 50 into fixed engagement with the upper cover 38. Removably secured to the flange section 50, and extending upwardly therefrom, is an enclosure member 52, which functions to shield the moving components of the heat-generating apparatus from bystanders, and further functions to minimize atmospheric dissipation of generated heat.

The drive shaft 16 is received in an appropriately sized aperture in the enclosure member 52 and is supported at one end by a lower bearing 54 which is secured to the lower end 44 of the friction chamber 12. The drive shaft 16 is supported adjacent its opposite end by an upper bearing 56 secured to the upper surface of the enclosure member 52. The bearings 54 and 56, and the aperture in the enclosure member 52, are disposed so that the drive shaft 16 is coaxially disposed with respect to the cylindrical inner surface 48 of the friction chamber 12; the bearings 54 and 56 permit the drive shaft 16 to rotate about its longitudinal axis. The drive shaft 16 is drivingly engaged outside the friction chamber 12 to a power assembly in a manner to be described hereafter.

Figure 2:
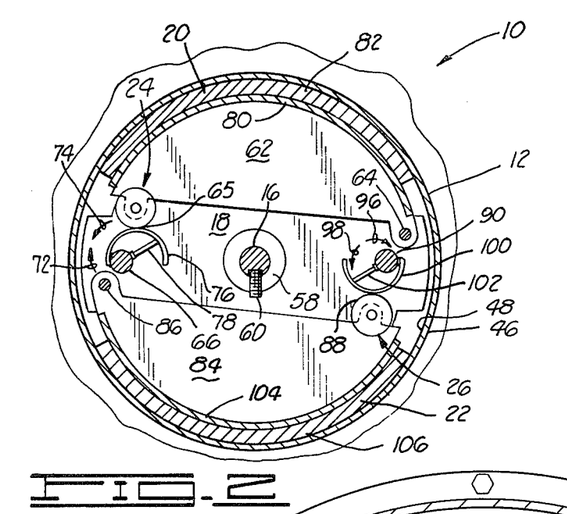
FIG. 2 is a plan view of the heat-generating apparatus, taken along line 2—2 of FIG. 1, showing the operating plate, the first and second shoe placement assemblies and the first and second shoe members.

As shown in FIGS. 1 and 2, the operating plate 18 comprises a flat member having a centrally disposed aperture enclosed by an annular flange section 58. An internally threaded aperture passes through the flange section 58, in which threaded aperture is received a setscrew 60. The drive shaft 16 is clearingly receivable through the flange section 58 and the aperture formed in the operating plate 18. The setscrew 60 may be threaded into gripping engagement with the drive shaft 16, thereby supporting the operating plate 18 at a selected longitudinal location on the drive shaft 16, and also thereby rendering the operating plate 18 rotatable with the drive shaft 16.

It will be noted that the setscrew 60 and the flange section 58 cooperate to form an operating plate positioning assembly, with which the operating plate 18 may be selectively varied in its longitudinal location on the drive shaft 16. Such variation in location may be accomplished by unthreading the setscrew 60 from gripping engagement with the drive shaft 16, thereafter moving the operating plate 18 into a new position on the drive shaft 16, and thereafter re-engaging the setscrew 60 with the drive shaft 16. Relocation of the operating plate 18 in this manner may be necessitated by wear of the inner surface 48 of the friction chamber 12 adjacent a previous location of the operating plate 18. Relocation of the operating plate 18 assures proper friction-generating contact of the shoe members 20 and 22 with the inner surface 48.

With reference to FIG. 2, the first shoe placement assembly 24 comprises a first shoe support plate 62 in pivotal engagement with the operating plate 18 at a first pivot point 64. The first shoe support plate 62 is characterized by an arcuate profile having a radius of curvature somewhat smaller than that of the inner surface 48 of the friction chamber 12. As shown in FIG. 2, the first pivot point 64 is located adjacent the extremity of the arcuate contour of the first shoe support plate 62, while adjacent the opposite extremity, at a location spaced from the first pivot point 64, is a first cam-engaging surface 65, which preferably comprises a bearing having a curved external surface. The function of the first cam-engaging surface 65 will be discussed later in this disclosure.

As shown in both FIGS. 1 and 2, the first shoe placement assembly 24 further comprises a first control shaft 66 having a first end 68 and a second end 70. As best shown in FIG. 1, the first end 68 is tapered to a reduced radius and is received through an appropriately sized aperture in the operating plate 18, so that the first control shaft 66 is thereby retained by the operating plate 18 in a vertical position substantially parallel to the drive shaft 16. Sufficient clearance is provided between the aperture in the operating plate 18 and the tapered first end 68 of the first control shaft 66 so that the first control shaft 66 is rotatable about its longitudinal axis in a first rotational direction 72 and in an opposite second rotational direction 74. (shown in FIG. 2).

With continued reference to FIG. 2, the first shoe placement assembly 24 further comprises a first control cam 76, preferably comprising an axially extending member of arcuate cross-section, tangentially secured to the first control shaft 66 by welding or the like. A support element 78 may be provided in order to maintain first control cam 76 in bracing engagement with the first control shaft 66. The first control cam 76 is oriented toward the first shoe support plate 62, and more particularly the first cam-engaging surface 65 thereof, and is characterized by a radius of curvature greater than that of the first control shaft 66, and a center of curvature offset from the longitudinal axis of the first control shaft 66.

The curved surface of the first control cam 76 extends in the first rotational direction 72 from its line of contact with the first control shaft 66. Thus, when the first cam-engaging surface 65 is in contact with the first control cam 76, the rotation of the first control shaft 66 in the opposite second rotational direction 74 will urge the first cam-engaging surface 65 away from the first control shaft 66, and thus away from the operating plate 18 (on which the first control shaft 66 is disposed). The operational consequences of this feature will be discussed hereafter.

As best shown in FIG. 2, the first shoe member 20 is supported adjacent the arcuate edge of the first shoe support plate 62. The first shoe member 20 is an axially-extending member, of arcuate cross-section, formed from a rigid backing member 80, to which is secured a coaxial friction-generating surface 82, having substantially the same radius of curvature as the inner surface 48 of the friction chamber 12. The friction-generating surface 82 preferably comprises a sturdy, wear-resistant, heat-resistant material, such as the material used in automotive brake shoes.

From the foregoing descriptions of the first shoe member 20 and the first shoe placement assembly 24, it will be understood that rotation of the first control shaft 66 in the second rotational direction 74 will urge the first shoe support plate 62 away from the operating plate 18; the first shoe member 20 (supported on the first shoe support plate 62), is therefore urged away from the operating plate 18. The extent to which the first control shaft 66 is rotated in the second rotational direction 74 will control the distance to which the first shoe member 20 is urged from the operating plate 18. It will be further noted that, when the operating shaft 18 is stationary, the first shoe member 20 is not subject to any restoring force urging the first shoe member 20 to an equilibrium location; thus, there are no springs or similar restraints on either the first shoe member 20 or the first shoe support plate 62.

With continued reference to FIG. 2, the second shoe placement assembly 26 comprises a second shoe support plate 84 in pivotal engagement with the operating plate 18 at a second pivot point 86. The second pivot point 86 is located at the opposite corner of the operating plate 18 from the first pivot point 64, so that the second shoe support plate 84 is disposed on the opposite side of the operating plate 18 from the first shoe support plate 62. The second shoe support plate 84, which is preferably identical in construction to the first shoe support plate 62, is characterized by an arcuate profile having a radius of curvature somewhat smaller than that of the inner surface 48 of the friction chamber 12. As shown in FIG. 2, the second pivot point 86 is located adjacent one extremity of the arcuate contour of the second shoe support plate 84, while adjacent the opposite extremity, at a location spaced from the second pivot point 86, is a second cam-engaging surface 88, which is preferably identical to the first cam-engaging surface 65.

As shown in both FIGS. 1 and 2, the second shoe placement assembly 26 further comprises a second control shaft 90, identical to the first control shaft 66, having a first end 92 and a second end 94. As best shown in FIG. 1, the first end 92 is tapered to a reduced radius and is received through an appropriately sized aperture in the operating plate 18, so that the second control shaft 90 is threby retained by the operating plate 18 in a vertical position substantially parallel to the drive shaft 16. The aperture receiving the second control shaft 90 is disposed on the opposite side of the drive shaft 16 from the aperture receiving the first control shaft 66, so that the second control shaft 90 is disposed on the opposite side of the drive shaft 16 from the first control shaft 66. Sufficient clearance is provided between the aperture in the operating plate 18 and the tapered first end 92 of the second control shaft 90 so that the second control shaft 90 is rotatable about its longitudinal axis in a first rotational direction 96 and in an opposite second rotational direction 98 (shown in FIG. 2).

With continued reference to FIG. 2, the second shoe placement assembly 26 further comprises a second control cam 100, preferably identical in configuration to the first control cam 76, tangentially secured to the second control shaft 90 by welding or the like. A support element 102 may be provided in order to maintain the second control cam 100 in bracing engagement with the second control shaft 90. The second control cam 100 is oriented toward the second shoe support plate 84, and more particularly the second cam-engaging surface 88 thereof, and is characterized by a radius of curvature greater than that of the second control shaft 90, and a center of curvature offset from the longitudinal axis of the second control shaft 90.

The curved surface of the second control cam 100 extends in the first rotational direction 96 from its line of contact with the second control shaft 90. Thus, when the second cam-engaging surface 88 is in contact with the second control cam 100, the rotation of the second control shaft 90 in the opposite second rotational direction 98 will urge the second cam-engaging surface 88 away from the second control shaft 90, and thus away from the operating plate 18 (on which the second control shaft 90 is disposed). The operation consequences of this feature will be discussed later in this disclosure.

As best shown in FIG. 2, the second shoe member 22 is supported adjacent the arcuate edge of the second shoe support plate 84. The second shoe member 22 is preferably identical to the first shoe member 20, and comprises an axially-extending member, of arcuate cross-section, formed from a rigid backing member 104, to which is secured a coaxial friction-generating surface 106, having substantially the same radius of curvature as the inner surface 48 of the friction chamber 12. The friction-generating surface 106 is preferably identical in composition to the friction-generating surface 82 of the first shoe member 20.

From the foregoing descriptions of the second shoe member 22 and the first shoe placement assembly 26, it will be understood that rotation of the second control shaft 90 in the second rotational direction 98 will urge the second shoe support plate 84 away from the operating plate 18; the second shoe member 22 (supported on the second shoe support plate 84) is therefore urged away from the operating plate 18. The extent to which the second control shaft 90 is rotated in the second rotational direction 98 will control the distance to which the second shoe member 22 is urged from the operating plate 18. It will be further noted that, when the operating shaft 18 is stationary, the second shoe member 22 is not subject to any restoring force urging the second shoe member 22 to an equilibrium location; thus, there are no springs or similar restraints on either the second shoe member 22 or the second shoe support plate 84.

From the foregoing description of the first shoe placement assembly 24 and the second shoe placement assembly 26 it will be understood that, by rotation of the first control shaft 66 in the second rotational direction 74, and by rotation of the second control shaft 90 in the second rotational direction 98, the friction-generating surfaces 82 and 106 of the shoe members 20 and 22 may be urged against the inner surface 48 of the friction chamber 12. When the drive shaft 16 is rotating, the friction-generating surfaces 82 and 106 will be moving in a circular path around the inner surface 48; urging of the friction-generating surfaces 82 and 106 against the inner surface 48 during this rotation will result in frictional resistance which will in turn cause the generation of heat. This heat may pass through the friction chamber 12 and be transmitted to heat transfer fluid 40 in the fluid reservoir 14.

As shown in FIG. 1, the heat-generating apparatus 10 of the present invention further comprises a shield plate 108 having a central aperture enclosed by a flange section; the shield plate 108 is installed on the drive shaft 16 through the central aperture, and is secured by a setscrew which extends through the flange section into gripping engagement with the drive shaft 16. The shield plate 108 is clearingly received by the inner surface 48 of the friction chamber 12 and is located adjacent the open upper end 42 of the friction chamber 12. The shield plate 108 functions to contain heat generated with the friction chamber 12, and thus assures that this heat is channeled to the fluid reservoir 14, and is not dissipated to the atmosphere. The shield plate 108 features appropriate sized apertures on opposite sides of the central aperture, in order to permit the first and second control shafts 66 and 90 to clearingly extend through the shield plate 108.

Figure 3:
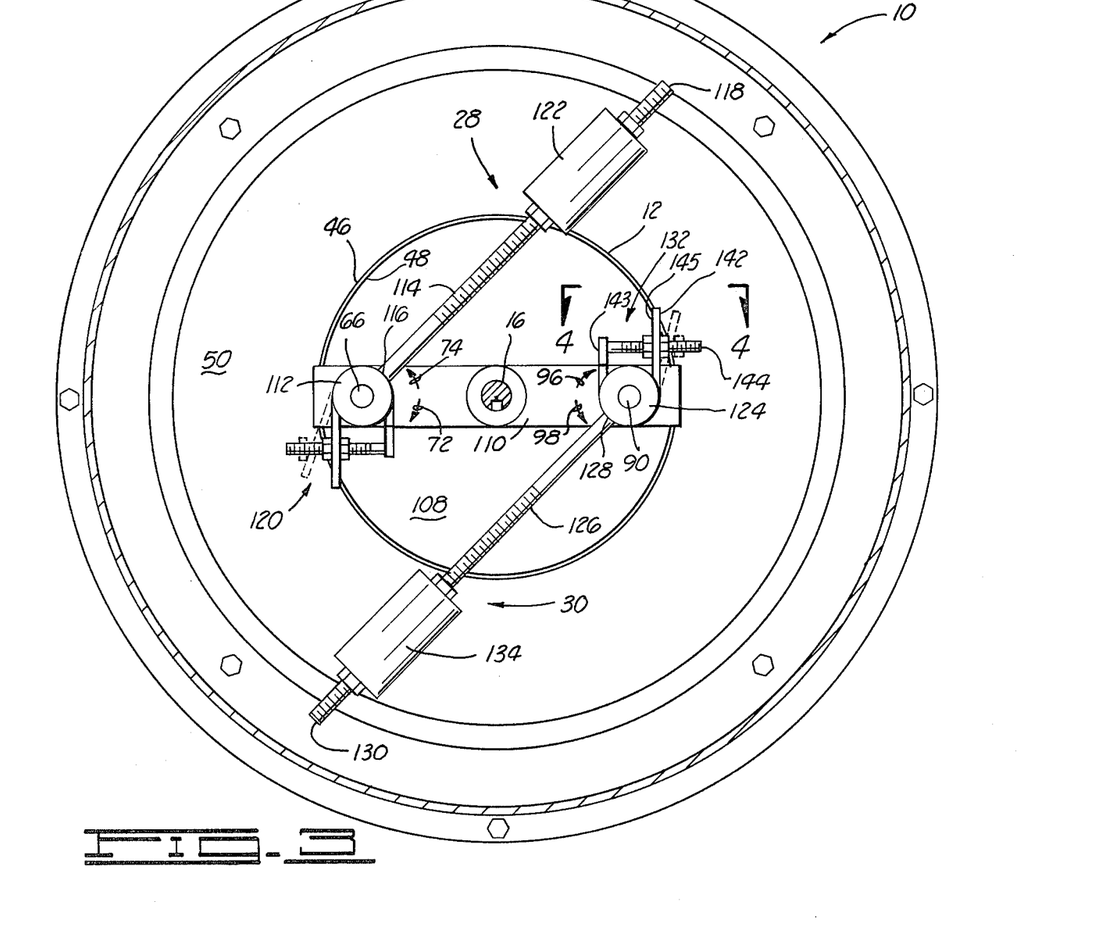
FIG. 3 is a plan view of the heat-generating apparatus, taken along line 3—3 of FIG. 1, showing the first and second centrifugal control assemblies.

With reference to FIGS. 1 and 3, the heat-generating apparatus 10 further comprises a guide member 110, having a central aperture enclosed by flange section; the guide member 110 is removably installed on the drive shaft 16 through the central aperture, and is secured by a setscrew which extends through the flange section into gripping engagement with the drive shaft 16. The guide member 116, which is preferably installed outside the friction chamber 12, comprises appropriately sized apertures on either side of the central aperture, through which the first and second control shafts 66 and 90 clearingly extend, adjacent their seconds ends 70 and 94.

With reference to FIG. 3, the first centrifugal control assembly 28 comprises a first sleeve member 112 comprising an annular member having an axial bore through which the first control shaft 66 may be clearingly received, adjacent the first end 68 thereof. Further comprising the first centrifugal control assembly 28 is an elongate first extension member 114, having a first end 116 and a second end 118. The first end 116 is secured to the first sleeve member 112 so that the first extension member 114 is disposed perpendicularly to the first control shaft 66.

The first extension member 114, and the first sleeve member 112, are maintained in fixed orientation relative to the first control shaft 66 by a first binding assembly 120, to be described hereafter; thus, the first extension member 114 is rotatable as a unit with the first control shaft 66, when the first control shaft 66 rotates about its longitudinal axis. Further comprising the first extension member 114 is a first mass member 122, which preferably comprises a cylindrical member having a threaded axial bore, which may be threaded onto matching threads provided on the first extension member 114. The threaded engagement of the first mass member 122 with the first extension member 114 permits the first mass member 122 to be selectively positioned between the first end 116 and second end 118 of the first extension member 114.

With continued reference to FIG. 3, the first extension member 114 is shown in a rest position, in which the center of mass of the first extension member 114 is disposed relatively closely to the drive shaft 16. In order for the center of mass of the first extension member 114 to move away from the drive shaft 16, the first extension member 114, and the first control shaft 66 secured thereto, must rotate in the second rotational direction 74. The operational consequences of this feature will be discussed hereafter.

As shown in FIG. 3, the second centrifugal control assembly 30 comprises a second sleeve member 124, preferably identical in construction to the first sleeve member 112, which is coaxially installed on the second control shaft 90 adjacent its second end 90. An elongate second extension member 126, preferably identical to the first extension member 114, and having a first end 128 and second end 130, is secured at its first end 128 so that the second extension member 126 is disposed perpendicularly to the second control shaft 90.

The second extension member 126 and the second sleeve member 124 are maintained in fixed orientation relative to the second control shaft 90 by a second binding assembly 132, to be described hereafter; thus, the second extension member 126 is rotatable as a unit with the second control shaft 90, when the second control shaft 90 rotates about its longitudinal axis. Further comprising the second extension member 126 is a second mass member 134, preferably identical in construction to the first mass member 122. The second mass member 134 may be threadedly engaged on the second extension member 126, and may thus be selectively positioned between the first end 128 and second end 130 of the second extension member 126.

With reference to FIG. 3, the second extension member 126 is shown in a rest position, substantially parallel to the first extension member 114. In its rest position, the center of mass of the second extension member 126 is disposed relatively closely to the drive shaft 16. In order for the center of mass of the second extension member 126 to move away from the drive shaft 16, the second extension member 126, and the second control shaft 90 secured thereto, must rotate in the second rotational direction 98. The operational consequences of this feature will be discussed hereafter.

Figure 4:
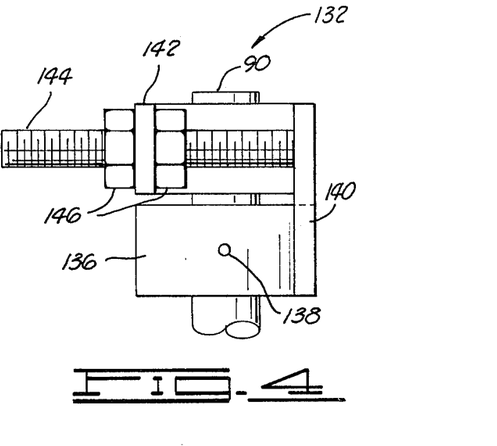
FIG. 4 is a detailed view of the second adjustment assembly, taken along line 4—4 of FIG. 3.

The first binding assembly 120 and the second binding assembly 132, both shown in FIG. 3, are identical in construction, so only the second binding assembly 132 will be described in detail. With reference to the detailed view of FIG. 4, the second binding assembly 132 comprises a first collar member 136 secured to the second control shaft 90 by a setscrew 138. A vertically extending post member 140 connects the first collar member 138 to a second collar member 142, best shown in FIG. 3. The second collar member 142 is a U-shaped member having a first end 143 integral with the post member 140, an intermediate portion, which is grippingly engaged to the periphery of the second sleeve member 134, and a second end 145. A bolt 144 extends between the first and second ends 143 and 145 of the second collar member 142 and extends through an appropriately sized aperture in the second end of the second collar member 142. As shown in FIG. 4, lock nuts 146 are provided to secure the second end 145 of the second collar member 142 relative to the bolt 144.

In the intermediate portion of the second collar member 142 an appropriate aperture (not shown) is provided, and a corresponding aperture (not shown) is provided in the second sleeve member 124. A setscrew (not shown) may then be threaded into these apertures in order to grippingly maintain the second sleeve member 124, and the second collar member 142, in fixed orientation relative to the drive shaft 16. When adjustment of orientation of the second sleeve member 124, and the second extension member 126 attached thereto, is required relative to the second control shaft 90, the setscrew engaging the second collar member 142 and the second sleeve member 124 is unthreaded from the bolt 144 so as to release the second end 145 of the second collar member 142. The second sleeve member 124 is then reoriented respective to the second control shaft 90, as required, and the setscrew and lock nut 146 are returned to their original positions, thereby securing the new orientation.

The reorientation process just described may be necessary when wear to the friction-generating surface 106 results in incomplete engagement of the second shoe member 22 with the inner surface 48 of the friction chamber 12. The friction-generating surface 106 may be biased towards better engagement with the friction chamber 12 by rotating the second control shaft 90 until the friction-generating surface is placed closer to the inner surface 48; however, in order to maintain the second extension member 126 in the position shown in FIG. 3, it will be necessary to reorient the second control shaft 90 and the second sleeve member 124 as just described.

As previously noted, the first binding assembly 120 is identical in construction to the second binding assembly 132, and permits the adjustable securing at the first control shaft 66 to the first sleeve member 112.

Referring to FIGS. 1, 2 and 3, in operation of the heat-generating apparatus 10, the drive shaft 16 is driven in the first rotational direction 72 and 96 (clockwise in the Figures) by the power assembly (to be described hereafter). The operating plate 18 rotates with the drive shaft 16, and thus the first and second control shafts 66 and 80 are caused to rotate in the first rotational direction. Centrifugal forces associated with this rotational movement cause the first and second extension members 114 and 126 to rotate outward, in the second rotational directions 74 and 98, thereby turning the first and second control shafts 66 and 90 in the second rotational directions 74 and 98.

The sequence of events occuring upon rotation of the first and second control shafts 66 and 90 in the second rotational directions 74 and 98 has been described previously. It will be recalled that this rotation results in the urging of the friction-generating surfaces 82 and 106 into heat-generating rotating contact with the inner surface 48 of the friction chamber 12. Because increasing speed of the drive shaft 16 increases the centrifugal force on the first and second extension members 114 and 126, and thus increases angular displacement of the control shafts 66 and 90 in the second rotational directions 74 and 98, it will be understood that increases in speed of the drive shaft 16 will tend to urge the shoe members 20 and 22 into increasing friction-generating contact with the friction chamber 12.

Upon decrease in the rotational speed of the drive shaft 16, the first and second extension members 114 and 126 will tend to return toward their stationary positions, shown in FIG. 3, and will thereby relax the force urging the shoe members 20 and 22 into friction-generating contact with the friction chamber 12. Relaxation of the shoe members 20 and 22 will result in return of the first and second shoe support plates 62 and 84 toward their stationary positions. Return of the extension members 114 and 126 toward their stationary positions will in turn result in return of the control shafts 66 and 90, and control cams 76 and 100 to their stationary positions.

In the event that rotation of the drive shaft 16 at a given ambient speed provides inadequate or excessive force urging the shoe members 20 and 22 against the friction cylinder 12, then the centrifugal control assemblies 28 and 30 may be adjusted as follows. If additional urging force is required, the mass members 122 and 134 may be moved closer to the second ends 118 and 130 of the extension members 114 and 126. This will create a greater leverage on the control shafts 66 and 90, resulting in greater force uring the shoe members 20 and 22 against the friction chamber 12. The urging force may be correspondingly reduced by moving the mass members 122 and 134 toward the first ends 116 and 128 of the extension members 114 and 126.

Figure 5:
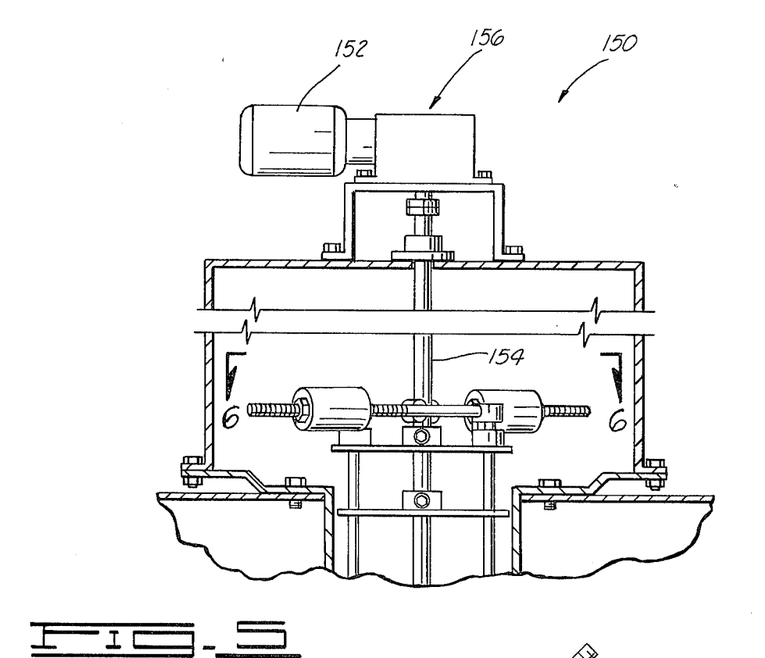
FIG. 5 is a partial elevational view of another embodiment the heat-generating apparatus of the present invention, in which an electrical motor functions as the power assembly.
Figure 6:
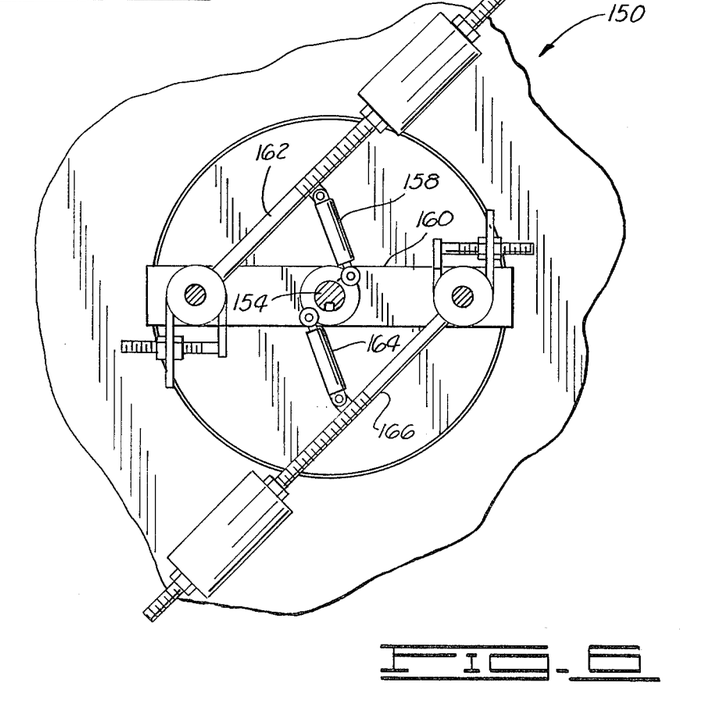
FIG. 6 is an elevational view of the heat-generating apparatus shown in FIG. 5, taken along line 6—6, showing the first and second centrifugal control assemblies and the first and second shock absorbers.

It will be recalled that the power assembly for driving rotation of the drive shaft 16 may comprise a windmill assembly 32, as shown in FIG. 1. However, an alternative power assembly is shown in FIGS. 5 and 6. This power assembly may be used exclusively, or as a backup system in the event the windmill assembly 32 is inoperative or unavailable, or in the event that weather conditions do not permit the use of the windmill assembly 32.

The heat-generating apparatus shown in FIGS. 5 and 6, generally designated by reference numeral 150, features a power assembly comprising an electrical motor 152 for driving the drive shaft 154, in via conventional mechanical power transmission assembly 156, such as a gearbox. With the following exception to be discussed immediately hereafter, the components of the heat-generating apparatus 150 are identical to those of the heat-generating apparatus 10 described with reference to FIGS. 1 through 4. A detailed description of these components will therefore not be repeated here.

Actuation of the electrical motor 152 will result in a rapid increase in rotational speed of the drive shaft 154. This rapid increase, in the apparatus 10 shown in FIGS. 1 through 4, would lead to rapid engagement of the shoe members with the friction chamber. Because startup of drive shaft rotation is so rapid with the electrical motor 152, the corresponding rapid increase in shoe member pressure against the friction chamber may lead to a disabling lockup of the apparatus 10.

This problem is avoided in the apparatus 150 as shown in FIG. 6. A first shock absorber 158 is secured at opposite ends to the guide plate 160 and to the first extension member 162. In like manner, a second shock absorber 164 is secured at opposite ends to the guide plate 160 and the second extension member 166. The shock absorbers 158 and 164 dampen the sudden impulse imparted to the extension members 162 and 166 as a result of startup of the drive shaft 154; thus, a more gradual engagement of the shoe members with the friction chamber is provided, so as to avoid apparatus lock-ups.

Figure 7:
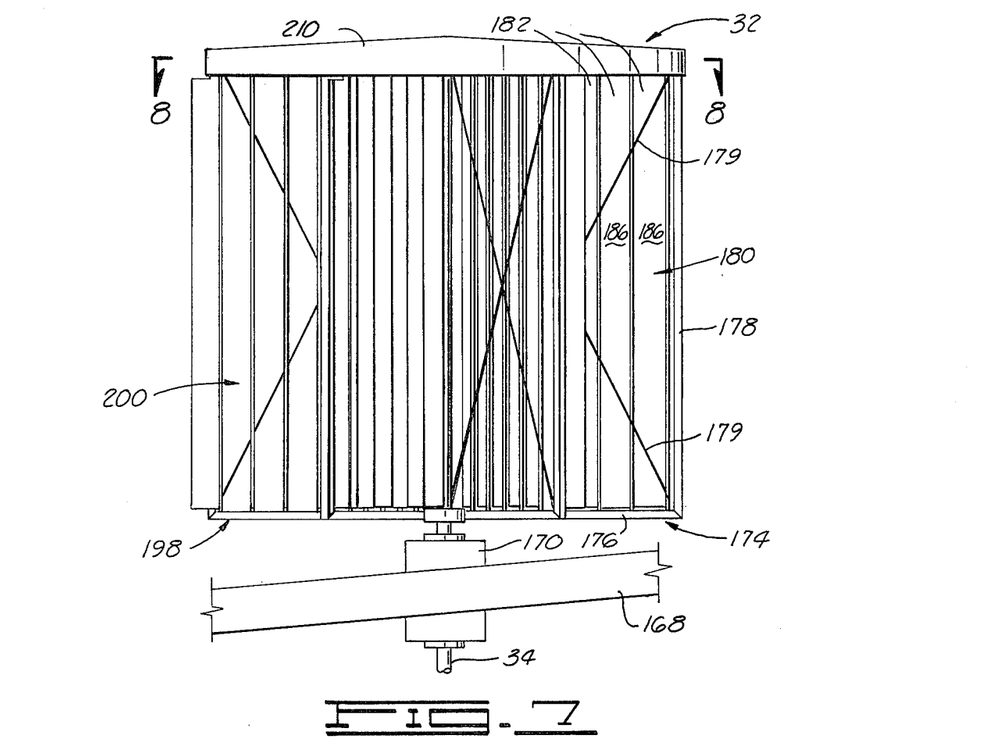
FIG. 7 is a detailed elevational view of the wind power system shown in FIG. 1.

With reference to FIGS. 1 and 7, the windmill assembly 32 is positioned so as to receive the unobstructed force of wind movement, as on an elevated structure, such as the roof 168. The windmill assembly 32 comprises the rotary shaft 34 which is rotatably supported by a bearing assembly 170. Further support for the rotary shaft 34 at its terminal end is provided by the bearing assembly 172. The windmill assembly 32 drives rotation of the rotary shaft 34 in response to wind movement; the rotary shaft is in turn drivingly engaged to the power transmission assembly 36, which drives rotation of the drive shaft 16 in response to rotation of the rotary shaft 34. The power transmission assembly 36 preferably comprises a conventional chain drive mechanism interconnecting the shafts 16 and 34.

Figure 8:
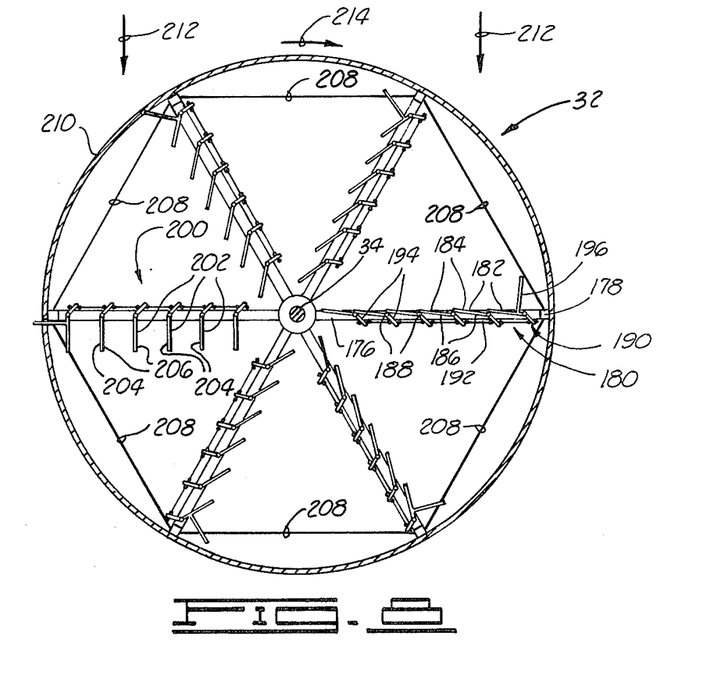
FIG. 8 is a plan view of the wind power system shown in FIG. 7, taken along line 8—8, showing the blade assemblies.

As shown in FIGS. 1, 7 and 8, the windmill assembly 32 comprises at least one blade assembly, supported on a support frame which is in turn supported by, and extends radially outward from the rotary shaft 34. Six such blade assemblies and support frames are provided in the embodiment shown in the Figures. However, it will be understood that any appropriate number of blade assemblies and support frames may be provided, as dictated by the power requirements and prevailing wind conditions associated with the windmill assembly 32.

The first support frame 174 comprises an upper horizontal member (not shown) secured to the rotary shaft 34 and extending radially outward therefrom, and a parallel lower horizontal member 176, also secured to the rotary shaft 34 and extending radially outward therefrom. The upper and lower horizontal members are interconnected by a vertical member 178. Cross brace members 179 may be provided to enhance the structural strength of the first support frame 174.

Disposed on the first support frame 174 is the first blade assembly 180, which comprises a plurality of flat blades 182, each blade having a first surface 184 (shown in FIG. 8) and an opposite second surface 186. Each blade 182 is secured to a vertically extending shaft member 188, shown in FIG. 8, which is in turn engaged at its opposite ends to the upper horizontal member and the lower horizontal member 176 of the first support frame 174. Each shaft member 188 is rotatable about its longitudinal axis, so that each blade 182 is rotatable about the axis of the shaft member 188, between a closed position, in which the blade 182 is directed substantially toward the rotary shaft 34, as shown in the Figures, and an open position (not shown) in which the blade surfaces 184 and 186 are substantially parallel to the rotary shaft 34. As is best shown in FIG. 8, the blades 182 are positioned on the first support frame 174 so that, when all of the blades 182 are in the closed position, the blades 182 are in overlapping relation, so as to define an uninterrupted wind impact surface.

As shown in FIG. 8, the windmill assembly 32 further comprises a blade positioning assembly 190, which comprises a connector assembly 192 and a plurality of blade orienting members 194. A blade orienting member 194 is secured to each blade 182 along its line of contact with the shaft member 188, and extends radially outward with respect to the shaft member 188. Each blade orienting member 194 is thus disposed in rotation-driving engagement with its corresponding blade 182. The blade orienting members 194 are disposed in identical spatial orientation to their corresponding blades 182, so that the blade 182—blade orienting member 194 combinations are effectively interchangeable. If desired, each blade orienting member 194 may be made integral with its corresponding blade 182.

The connection assembly 192 may comprise either a cable, or a plurality of cables, which form cable sections inner-connecting each adjacent pair of blade orienting members 194. Lengths of cable sections are selected so that each adjacent pair of blade orienting members 194, and thus each pair of adjacent blades 182, must be in identical spatial orientation (such as the closed blade position shown in FIG. 8) when the cable section is tensioned. Thus, when the blade most distant from the rotary shaft 34 is moved toward its closed position, tension in the cable section moves the adjacent blade 182 into the identical closed position, and tension in the next adjacent cable section moves the next adjacent blade 182 into its closed position, and so on. The blade positioning assembly 190 thus cooperatively moves the blades toward their closed positions in response to force applied to move the blade most distant from the rotary shaft 34 toward its closed position.

Alternatively, the connection assembly 192 may comprise a rigid control member, to which the blade orienting members 194 are secured at spaced locations therealong; each blade orienting member 194 is oriented identically with respect to the control member. Because such a rigid control member can transmit compressive force, unlike a cable assembly, the blade positioning assembly 190 may cooperatively move the blades 182 toward their closed positions in response to force applied to rotate any given blade 182 toward its closed position; further, the blade positioning assembly 190 may cooperatively move the blades 182 toward their open position in response to force applied to any given blade 182 toward its open position.

Further comprising the blade positioning assembly 190 is a projecting blade 196, shown in FIG. 8. The projecting blade 196 preferably has a larger surface area than an individual blade 182 of the first blade assembly 180. The projecting blade 196 extends perpendicularly from the blade 182 most distant from the rotary shaft 34, and is disposed so that it is directed substantially away from the rotary shaft 34 when the blade 182 from which it extends is in its open position; the projecting blade 196 thus extends perpendicularly from the first surface 184 of the blade 182 most distant from the rotary shaft 34.

With reference to FIGS. 7 and 8, the windmill assembly 32 further comprises a second support frame 198, identical in construction to the first support frame 174, which is supported by and extends radially from the rotary shaft 34. The second support frame 198 is offset by a predetermined angle, shown as 180° in the Figures, from the first support frame 174. A second blade assembly 200, identical in configuration to the first blade assembly 180, is supported by the second support frame 198. The second blade assembly 200 comprises a plurality of blades 202, each blade having a first surface 204 and an opposite second surface 206. Each blade 202 is rotatable between a closed position (not shown), in which the blade 202 is directed substantially toward the rotary shaft 34, and an open position (shown in FIG. 8) in which the blade surfaces 204 and 206 are disposed substantially parallel to the rotary shaft 34. Because the second blade assembly 200 is identical in construction to the first blade assembly 180, it will not be described in further detail.

Additional support frames and blade assemblies may be supported from the rotary shaft 34 as required. In order to provide for continuous powering of rotation of the rotary shaft 34, it is preferable that every support frame be angularly offset by from adjacent support frames by a single invariant angular displacement, as shown in FIG. 8. Connecting cables may be provided to secure adjacent support frames to one another, and a weather cover 210 is supported by the support frame in order to protect the windmill assembly 32 from precipitation.

With continued reference to FIG. 8, the operation of the windmill assembly 32 will now be described. Wind blowing from direction 212 will strike the overlapping blades of the first blade assembly 180, which presents an uninterrupted wind impact surface when in the position shown in FIG. 8. This wind impact will drive the first support frame 174, and the rotary shaft 34 secured thereto, in the clockwise direction shown by arrow 214. As the first blade assembly 180 rotates to a position 180° offset from the closed position shown in FIG. 8, wind impact from direction 212 will urge the blades of the first blade assembly 180 to an open position, identical to the blade position shown in FIG. 8 for the second blade assembly 200.

As the first blade assembly continues to rotate in direction 214, wind will strike the projecting blade 196 and urge the blades 182 back towards their closed position. As rotation continues, wind will strike the first surfaces 184 of the blades 182 and force the blades 182 further toward their closed positions. By the time the first support frame 174 has returned to the position shown in FIG. 8, the blades 182 will again be in their fully closed position, and the cycle just described may be repeated.

As the first support frame 174 is driven in the direction 214, other blade assemblies will be brought into the position occupied in FIG. 8 by the first blade assembly 180. The blades of these blade assemblies will likewise be disposed in a closed configuration and will thus present a wind impact surface which may be driven in direction 214 by wind impact, in a manner identical to that just described with reference to the first blade assembly 180. Successive wind impacts on the closed blades of the blade assemblies result in continuous rotation of the rotary shaft 34 in the direction 214.

From the foregoing description, it will be understood that rotation of the windmill assembly 32 in the single rotational direction 214 is possible because the blade assemblies present an uninterrupted wind impact surface at only one point in a rotational circuit. At the point 180° offset from the point of maximum wind impact on a closed blade assembly, the blades are caused to open, so as to present low wind resistance. At the 180° point, wind impact thus does not drive the blade assembly in a direction opposite to arrow 214, and net rotation in direction 214 is possible.

In order to prevent damage to the windmill assembly 32 and to any assemblies associated therewith, in the event of excessive wind speeds a governor assembly 216 may be provided. With reference to FIG. 9, the governor assembly 216 comprises a centrifugal member 218 comprising an elongate rod member 220 pivotally supported on the upper horizontal member 222 of the first support frame 174 at a pivot point 224. The pivot point 224 is preferably located at a point adjacent the blade 182 most distant from the rotary shaft 34. The centrifugal member 218 further comprises a mass member 226 disposed on the end of the rod member 220 opposite the pivot point 224.

A spring 228 interconnects the upper horizontal member 222 and the rod member 220, and biases the centrifugal member into a position oriented substantially toward the rotary shaft 34. The centrifugal member 218 further comprises a cam surface 230 which is engagable with a pin member 232 which projects vertically upward from the projecting blade 196 of the first blade assembly 180. Identical governor assemblies may be provided in like manner for the other blade assemblies of the windmill assembly 32.

As rotational speed of the first support frame 174 increases, the centrifugal member 218 will tend to rotate, as a result of centrifugal force, in the direction shown by the arrow 234. After sufficient rotation in direction 234 as a result of wind speed exceeding a preselected level, the cam surface 230 will engage the pin member 232 and urge the pin member 232, and the projecting blade 196 in the direction 234. This will in turn cause the blade 182 associated with the projecting blade to move toward its open position. The position of the components of the governor assembly 16 when so actuated is shown in dotted lines in FIG. 9.

It will be recalled that if the connection assembly 192 comprises a rigid control member, then the remaining blades 182 of the first blade assembly 180 will move to their open positions in response to movement of the blade 182 associated with the projecting blade 196 to its open position. Thus, the governor assembly 216, in response to excessive rotational speed of the rotary shaft 34, will open the blades of the first blade assembly 180 throughout the rotational cycle of the first support frame 174.

Because the first blade assembly 180 cannot present an uninterrupted wind impact surface during the rotational cycle, wind impact will result in a small torque on the rotary shaft 34 once the governor assembly 216 is actuated, and rotational speed will be reduced. When ambient wind speeds return to acceptable levels, the spring 228 will urge the centrifugal member 218 back to the position shown in solid lines in FIG. 9, and the cam surface 230 will be disengaged from the pin member 232. The windmill assembly 32 may then operate in a normal manner, as previously described with reference to FIG. 8.

Alternatively, if it is desired to utilize a governor assembly when the connection assembly comprises a cable or plurality of cables, a projecting blade, identical to the projecting blade 196, may be provided for the blade 182 nearest the rotary shaft 34. A governor assembly, identical to the governor assembly 216, may be supported on the upper horizontal member adjacent the rotary shaft 34, so as to be engageable with the just-mentioned projecting blade. Opening of the blade 182 adjacent the rotary shaft 34, urged by the governor assembly, will cause the cable or cables to draw open the remaining blades 182.

Changes may be made in the construction and the arrangement of the various parts and elements as disclosed herein without departing from the spirit and scope of the invention as defined in the following claims.

What is claimed is:

1. A heat-generating apparatus comprising:
    a friction chamber having an outer surface immersible in a heat transfer fluid and having a cylindrically shaped inner surface;
    a drive shaft rotatably supported in the friction chamber, and coaxially disposed with respect to the inner surface of the friction chamber;
    power means for driving rotation of the drive shaft about its longitudinal axis;
    an operating plate supported by the drive shaft at a selected longitudinal location thereon, and rotatable with the drive shaft;
    a first shoe member mechanically engaged with the operating plate and having a friction-generating surface;
    first shoe placement means, supported by the operating plate, for urging the first shoe member away from the operating plate to a selectable distance therefrom, the first shoe member, when stationary, not being subject to a restoring force urging the first shoe member to an equilibrium location, the first shoe placement means comprising:
        a first shoe support plate pivotally supported by the operating plate at a first pivot point, the first shoe support plate supporting the first shoe member and having a first cam-engaging surface spaced from the first pivot point;
        a first control shaft supported on the operating plate and extending substantially parallel to the drive shaft, the first control shaft rotatable about its longitudinal axis in a first rotational direction and in an opposite second rotational direction; and
        a first control cam supported on the first control shaft and engagable with the first cam-engaging surface, the first cam-engaging surface of the first shoe support plate, and the first shoe member disposed on the first shoe support plate, urgable away from the operating plate in response to rotation of the first control shaft in the second rotational direction; and
    first centrifugal control means, operatively engaged with the first shoe placement means, for controlling location of the first shoe member such that the friction-generating surface of the first shoe member is urged toward the inner surface of the friction chamber in response to increasing drive shaft rotational speed.

2. The apparatus of claim 1 in which the first shoe placement means comprises a first control shaft supported on the operating plate, substantially parallel to the drive shaft and rotatable about its longitudinal axis in a first rotational direction and in an opposite second rotational direction, with the first shoe member urgable away from the operating plate in response to rotation of the first control shaft in its second rotational direction, and in which the first centrifugal control means comprises:
    a first extension member rotatable with and extending perpendicularly to the first control shaft, the first extension member so disposed that movement of its center of mass away from the drive shaft drives rotation of the first control shaft about its longitudinal axis in the second rotational direction.

3. The apparatus of claim 1 in which the first centrifugal control means comprises:
    a first extension member rotatable with and extending perpendicularly to the first control shaft, the first extension member so disposed that movement of its center of mass away from the drive shaft drives rotation of the first control shaft about its longitudinal axis in the second rotational direction.

4. The apparatus of claim 2 or 3 in which the first extension member is characterized as having a first end and a second end, and further comprises:
    a first mass member longitudinally positionable at a selected position on the first extension member.

5. The apparatus of claim 3 further comprising:
    a second shoe member having a friction-generating surface, the second shoe member disposed on the opposite side of the drive shaft from the first shoe member;
    second shoe placement means, supported by the operating plate, for urging the second shoe member away from the operating plate, to a selectable distance therefrom, with the second shoe member, when stationary, not being subject to a restoring force urging the second shoe member to an equilibrium location, the second shoe placement means comprising:

a second shoe support plate, pivotally supported by the operating plate at a second pivot point, the second shoe support plate supporting the second shoe member and having a second cam-engaging surface spaced from the second pivot point;

a second control shaft supported on the operating plate and extending substantially parallel to the drive shaft, the second control shaft rotatable about its longitudinal axis in a first rotational direction and in an opposite second rotational direction and disposed on the opposite side of the drive shaft from the first control shaft; and a second control cam supported on the second control shaft and engagable with the second cam-engaging surface, the second cam-engaging surface of the second shoe support plate, and the second shoe member disposed on the second shoe support plate, urgable away from the operating plate in response to rotation of the second control shaft in its second rotational direction; and second centrifugal control means, operatively engaged with the second shoe placement means, for controlling location of the second shoe member, such that the friction-generating surface of the second shoe member is urged toward the inner surface of the friction chamber in response to increasing drive shaft rotational speed, the second centrifugal control means comprising:

a second extension member rotatable with and extending perpendicularly to the second control shaft, the second extension member so disposed that movement of its center of mass away from the drive shaft drives rotation of the second control shaft about its longitudinal axis in the second rotational direction.

6. The apparatus of claim 3 in which the power means comprises:

an electrical motor having a rotatable output shaft; and power transmission means for drivingly connecting the electrical motor to the drive shaft;

and in which the apparatus further comprises:

shock absorber means for damping rotation of the first extension member in the second rotational direction.

* * * * *